(12) United States Patent
Li

(10) Patent No.: US 6,836,575 B1
(45) Date of Patent: Dec. 28, 2004

(54) THREE-PORT PM CIRCULAR HAVING ISOLATION FUNCTION

(75) Inventor: Wei-Zhong Li, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 5 days.

(21) Appl. No.: 10/162,769

(22) Filed: Jun. 4, 2002

(51) Int. Cl.[7] ............... G02B 6/00; G02B 5/30; G02B 27/28
(52) U.S. Cl. ........................ 385/11; 359/497
(58) Field of Search ............... 385/11; 359/497

(56) References Cited

U.S. PATENT DOCUMENTS

| | | | |
|---|---|---|---|
| 4,548,478 A | | 10/1985 | Shirasaki |
| 5,408,354 A | * | 4/1995 | Hosokawa ............ 359/281 |
| 6,339,661 B1 | | 1/2002 | Kokkelink et al. |
| 2001/0053022 A1 | * | 12/2001 | Tai et al. ............ 359/484 |
| 2002/0060843 A1 | * | 5/2002 | Huang et al. ........ 359/484 |

* cited by examiner

*Primary Examiner*—John D. Lee
*Assistant Examiner*—Tina M Lin
(74) *Attorney, Agent, or Firm*—Fish & Richardson P.C.

(57) ABSTRACT

An optical device includes non-reciprocal combination-device and a polarizer. The non-reciprocal combination-device has a principal direction and a reverse principal direction. The non-reciprocal combination-device includes a first birefringent wedge, a second birefringent wedge, and a non-reciprocal rotating element. The polarizer receives a first light signal from the second birefringent wedge traveling in the principal direction and transmits a second light signal to enter the second birefringent wedge in the reverse principal direction.

30 Claims, 14 Drawing Sheets

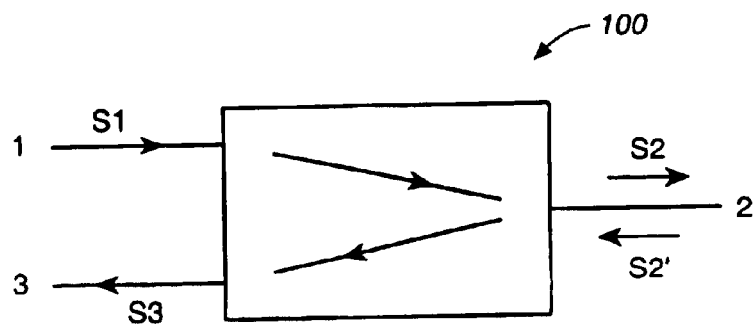
FIG._1a
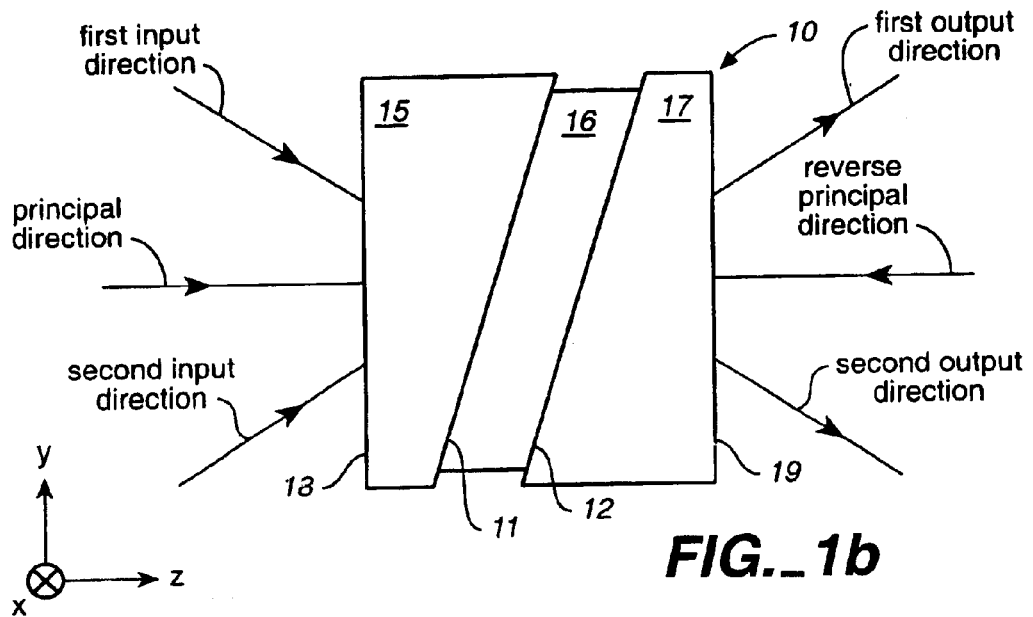
FIG._1b
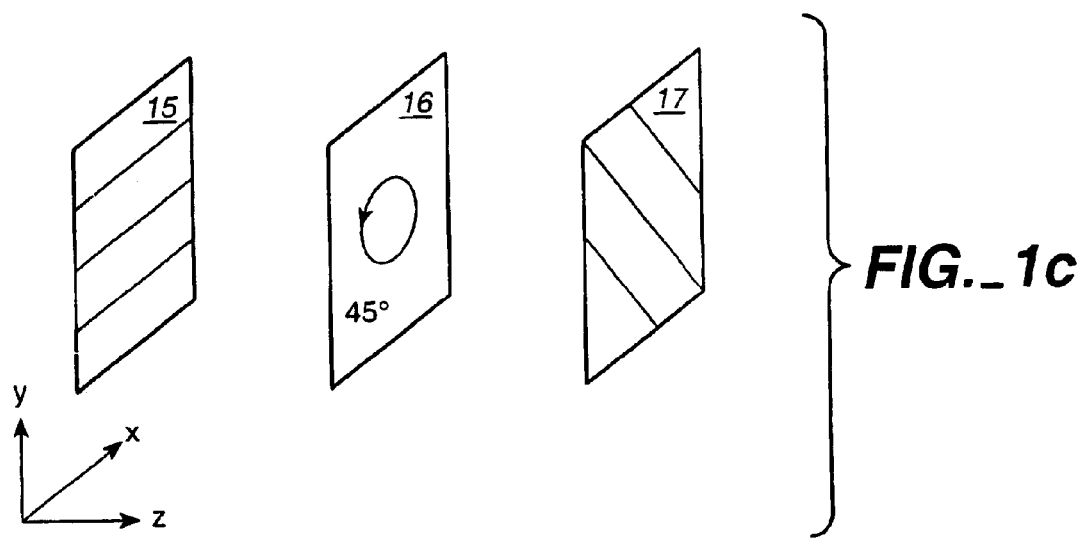
FIG._1c

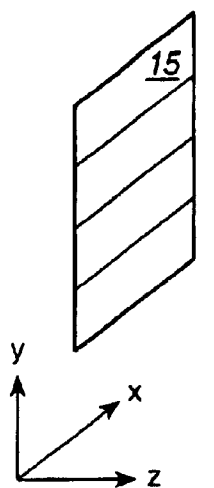
FIG._1d
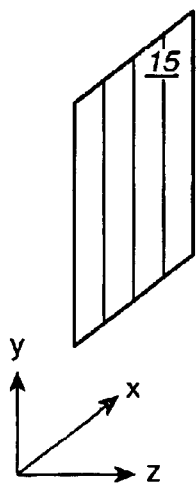
FIG._1e
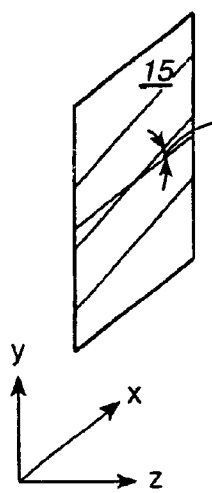
FIG._1f

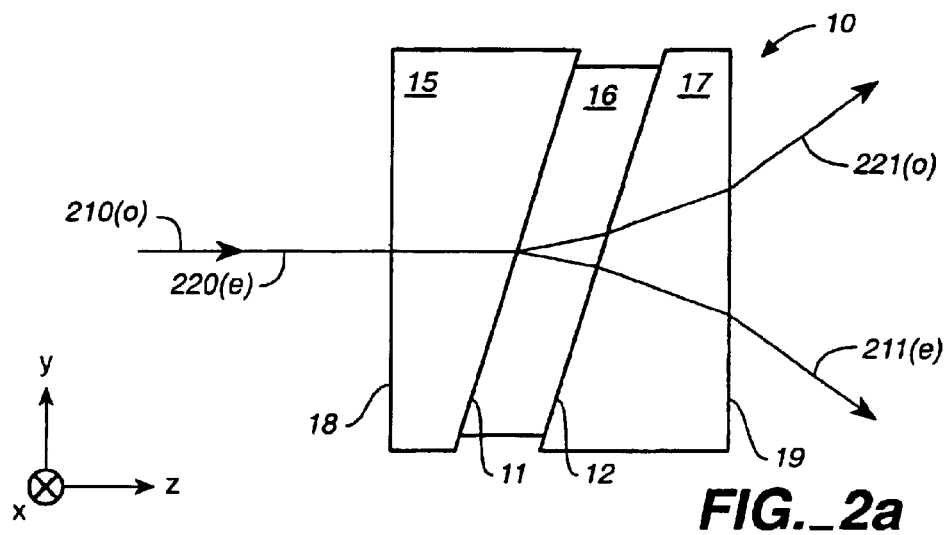
FIG._2a
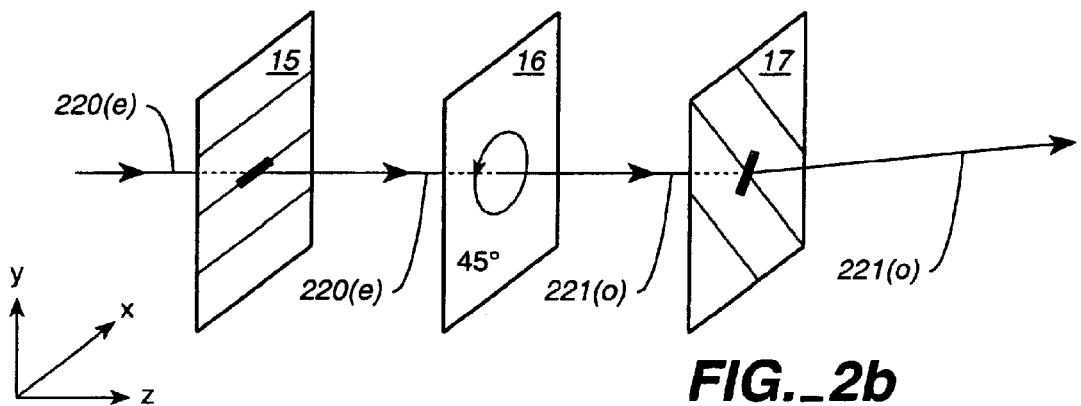
FIG._2b
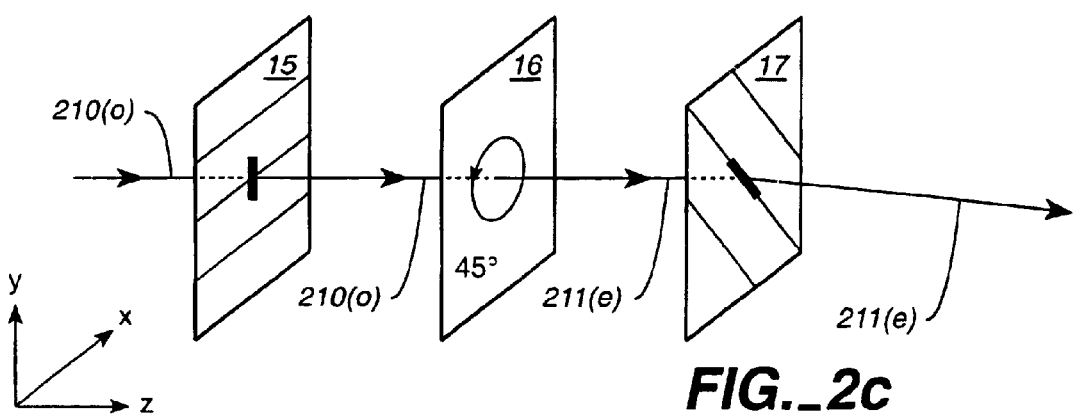
FIG._2c

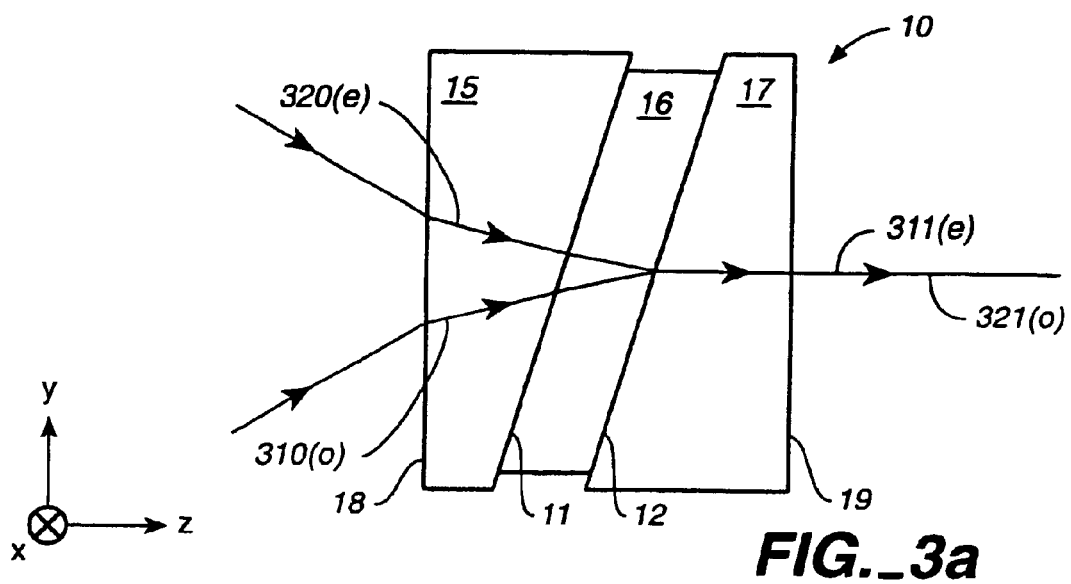
FIG._3a
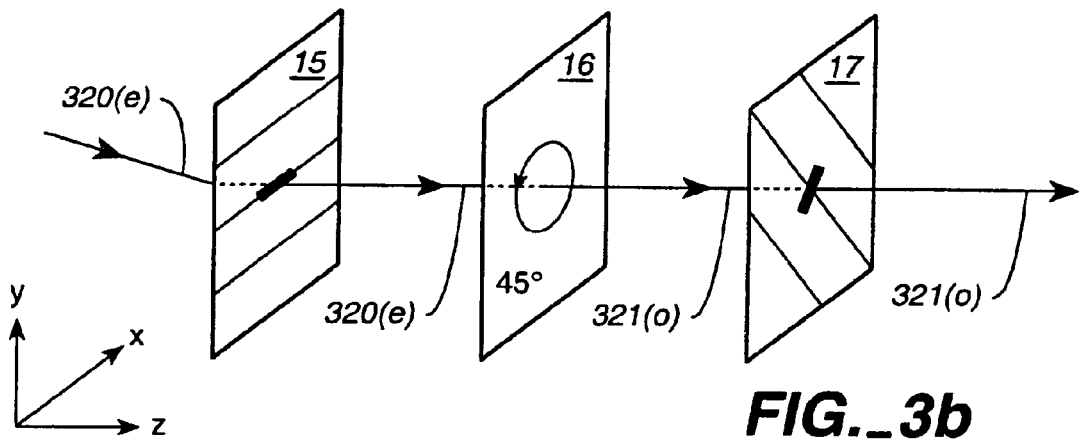
FIG._3b
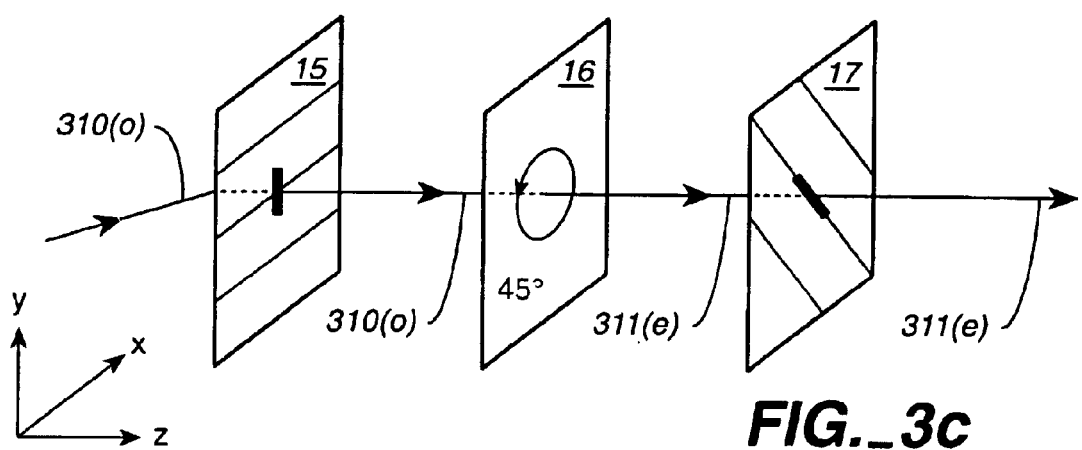
FIG._3c

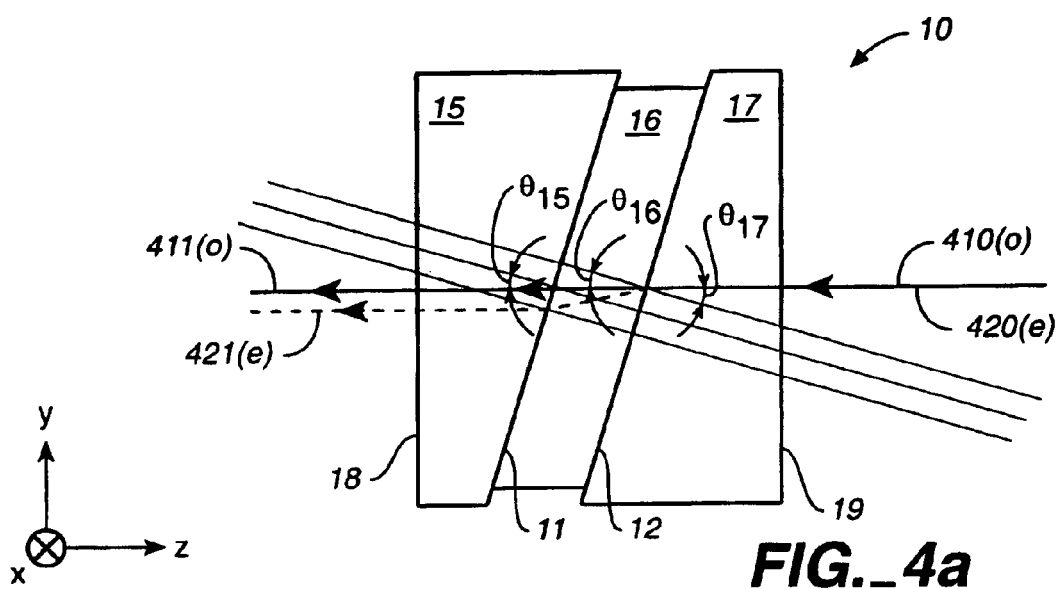
FIG._4a
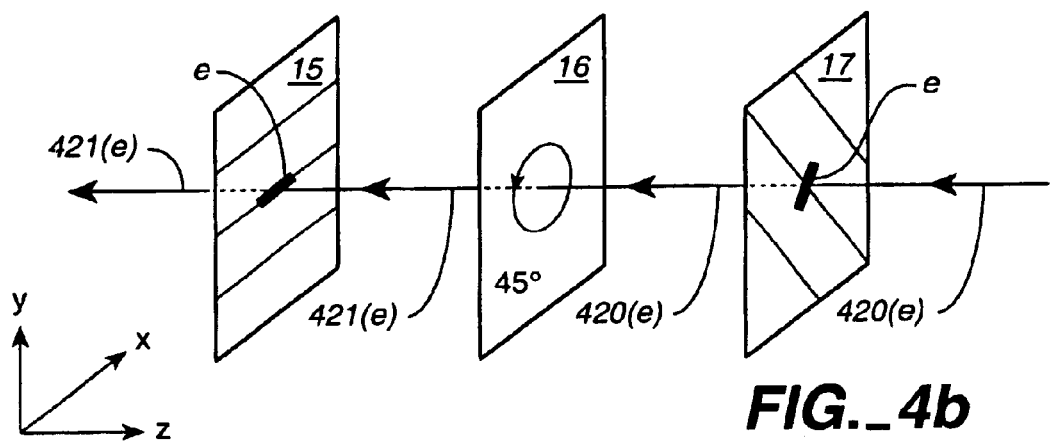
FIG._4b
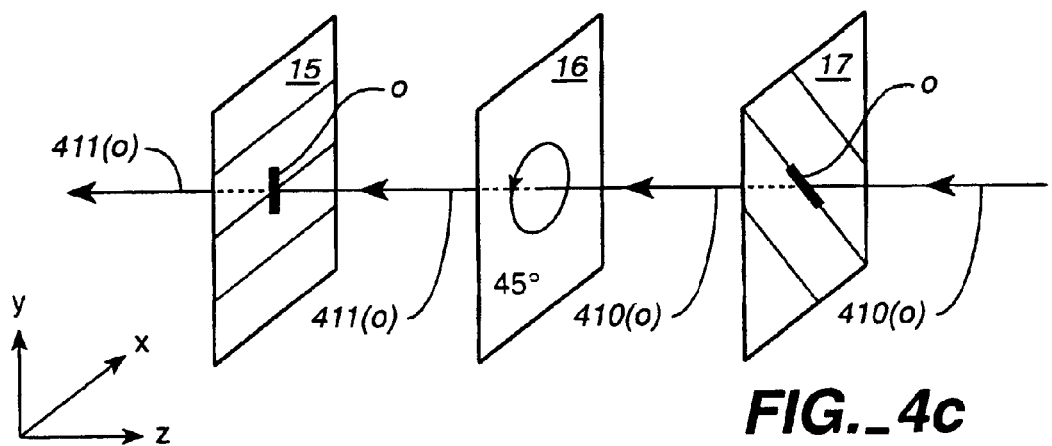
FIG._4c

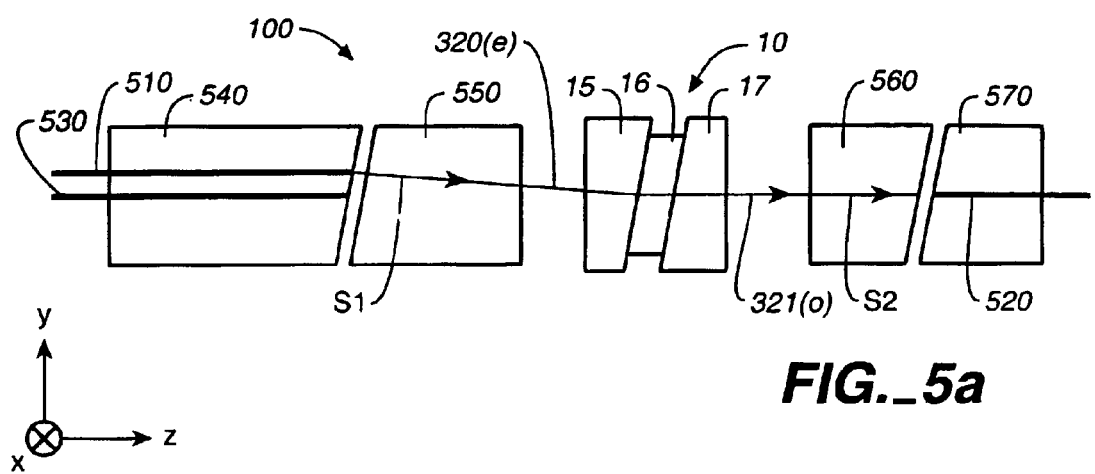
FIG._5a
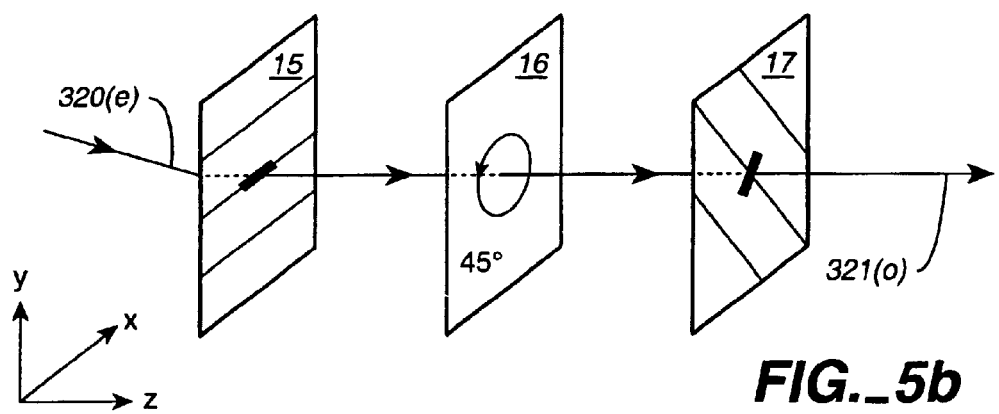
FIG._5b

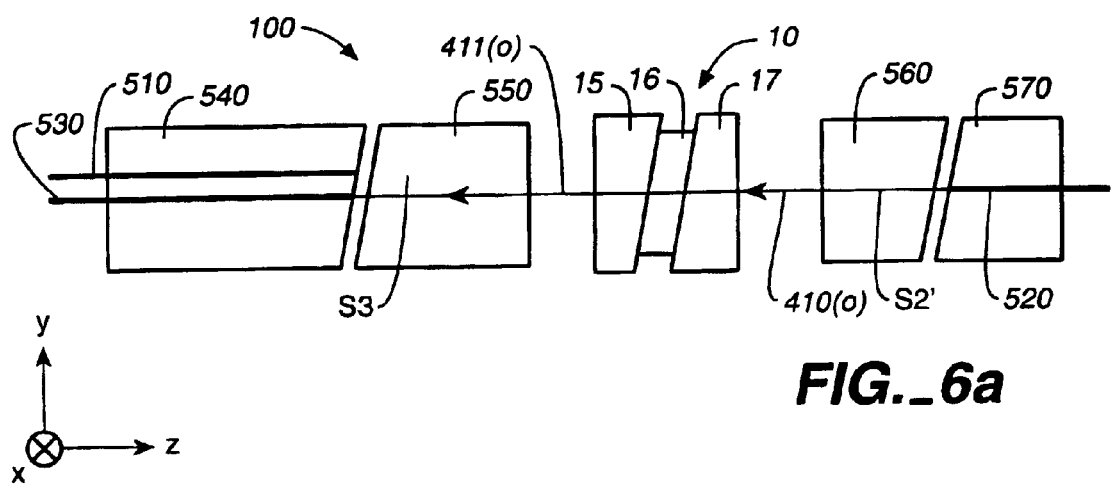
FIG._6a
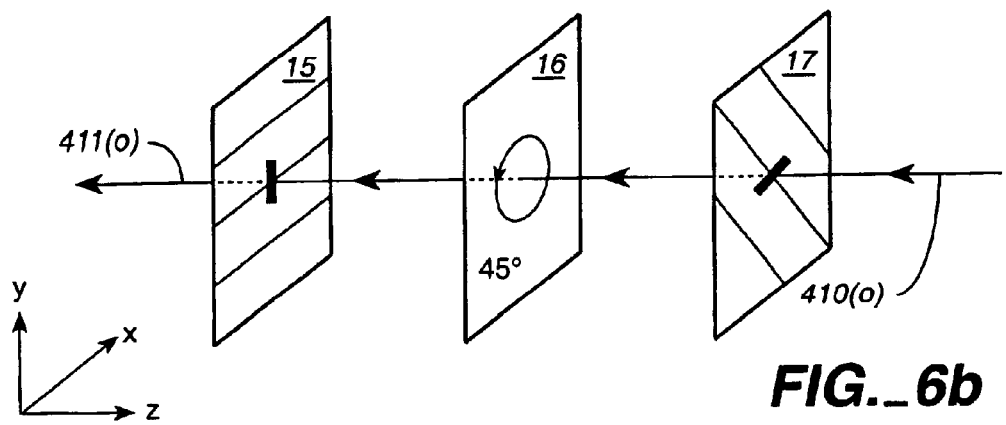
FIG._6b

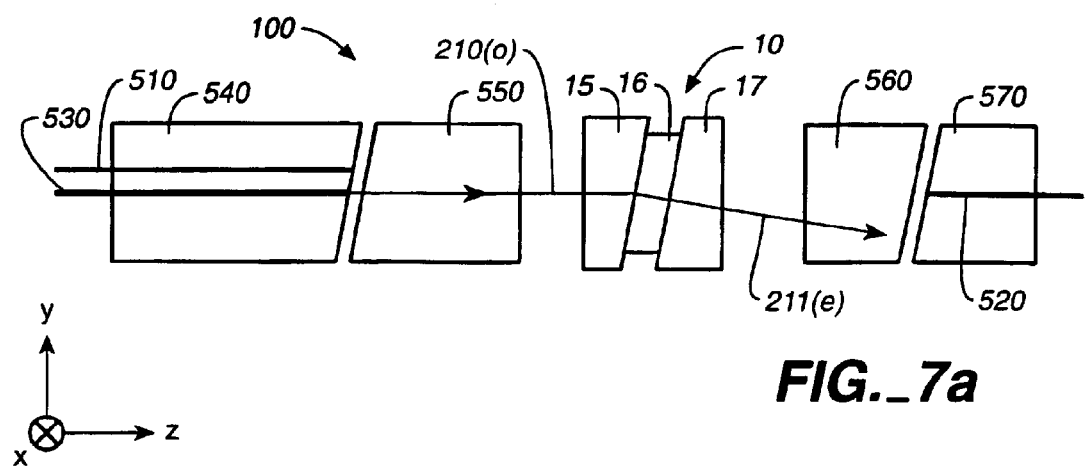
FIG._7a
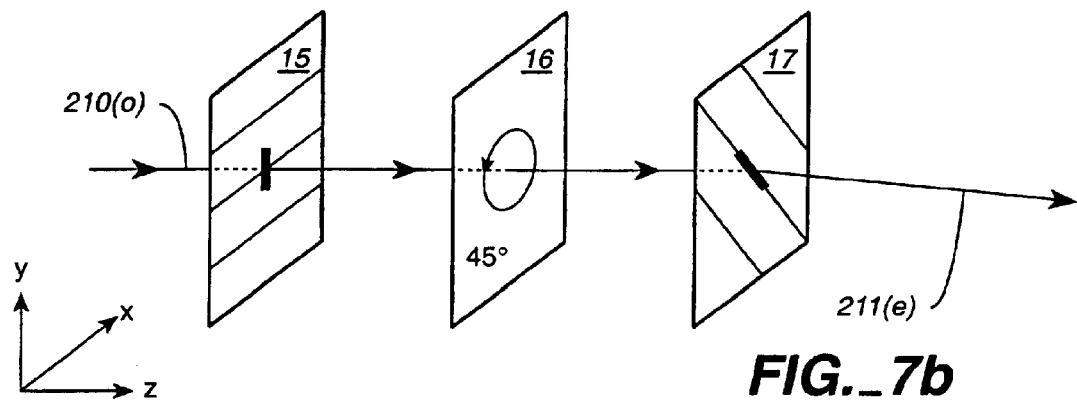
FIG._7b

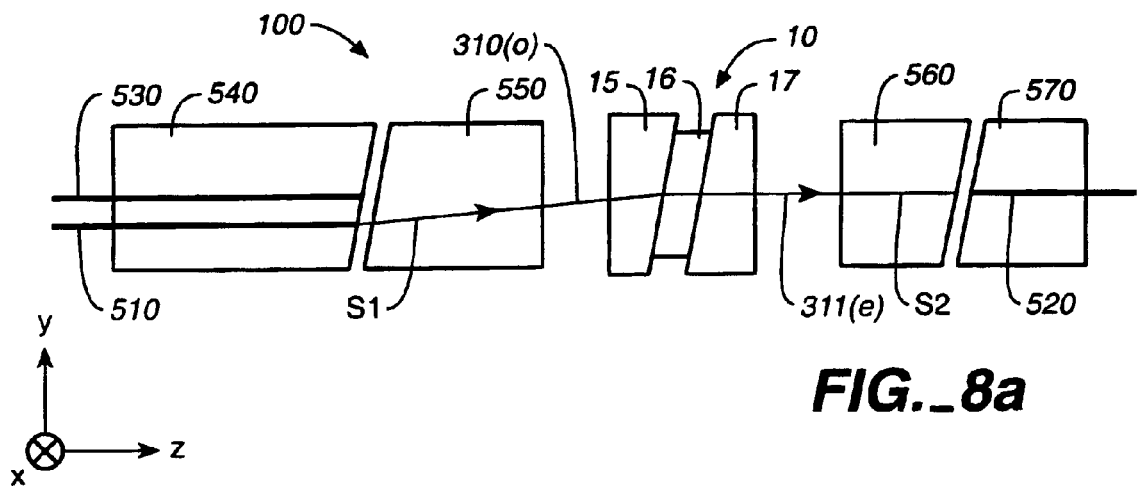
FIG._8a
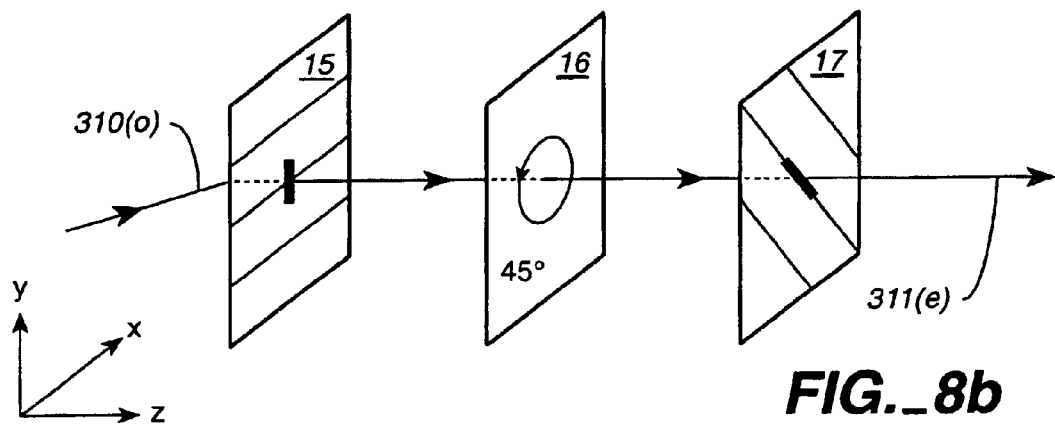
FIG._8b

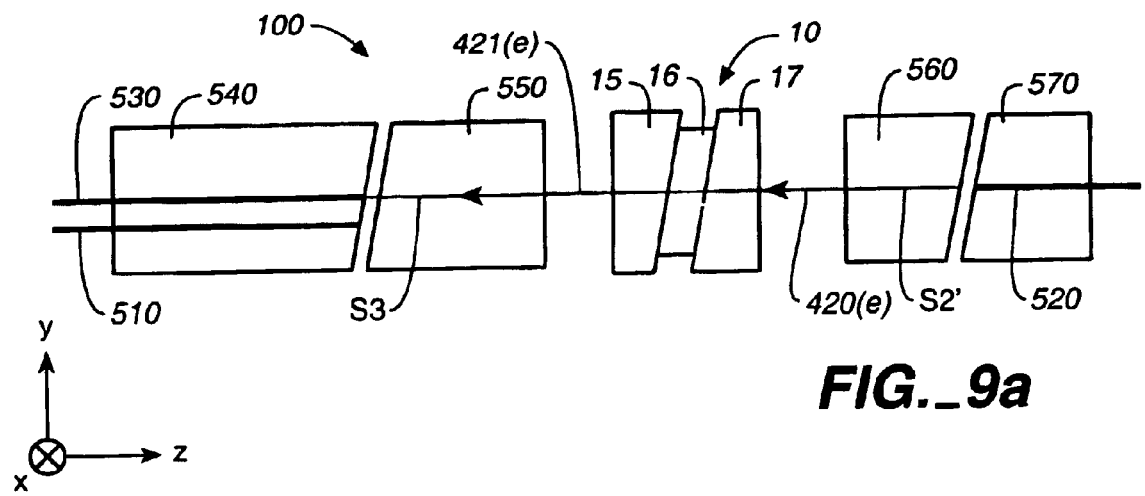
FIG._9a
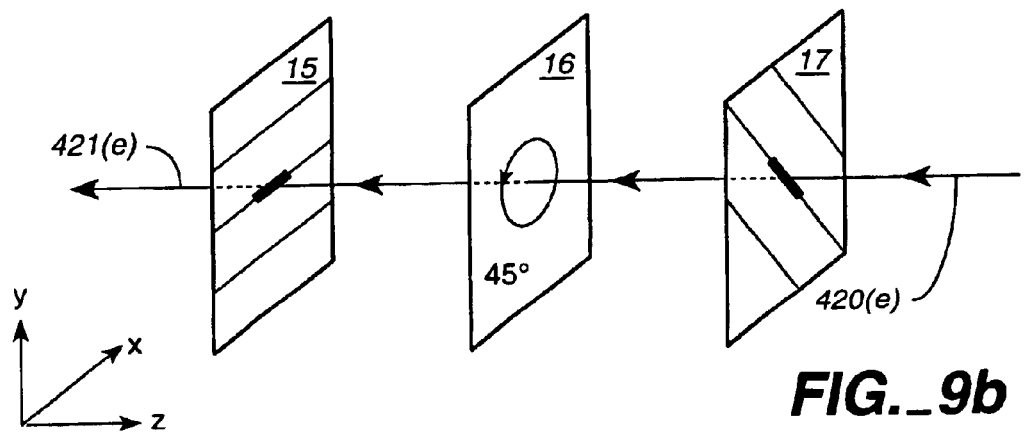
FIG._9b

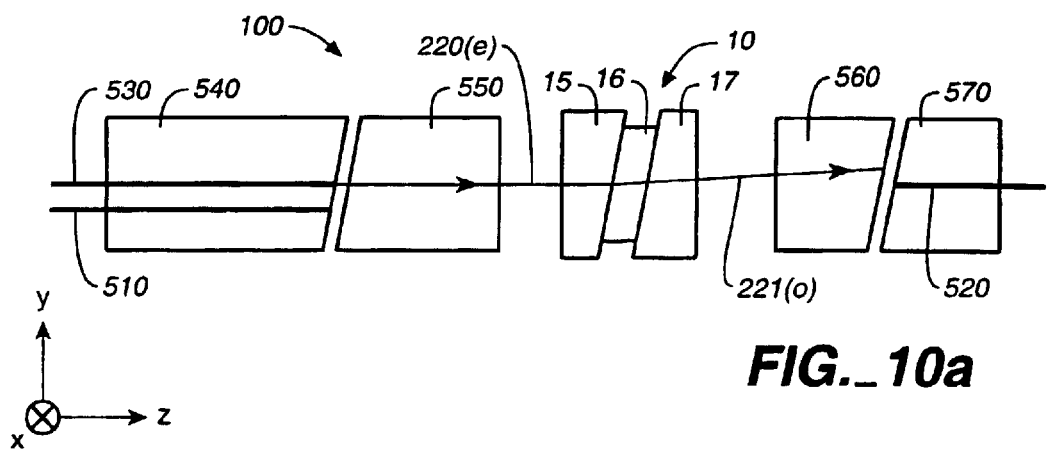
FIG._10a
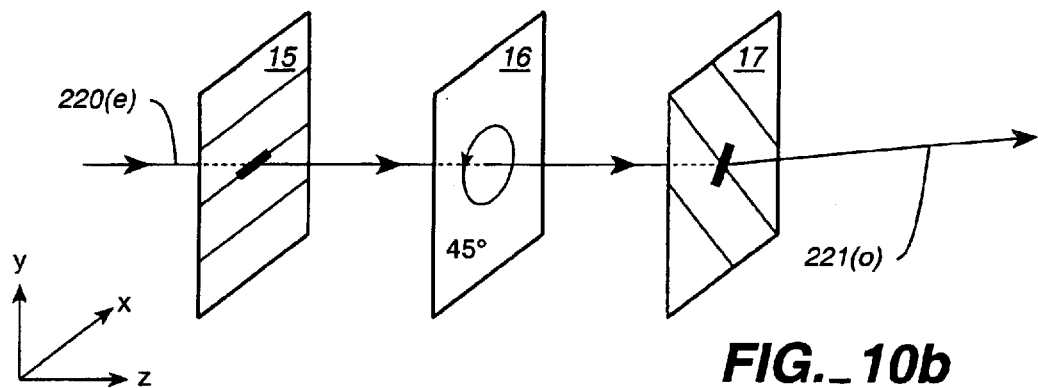
FIG._10b

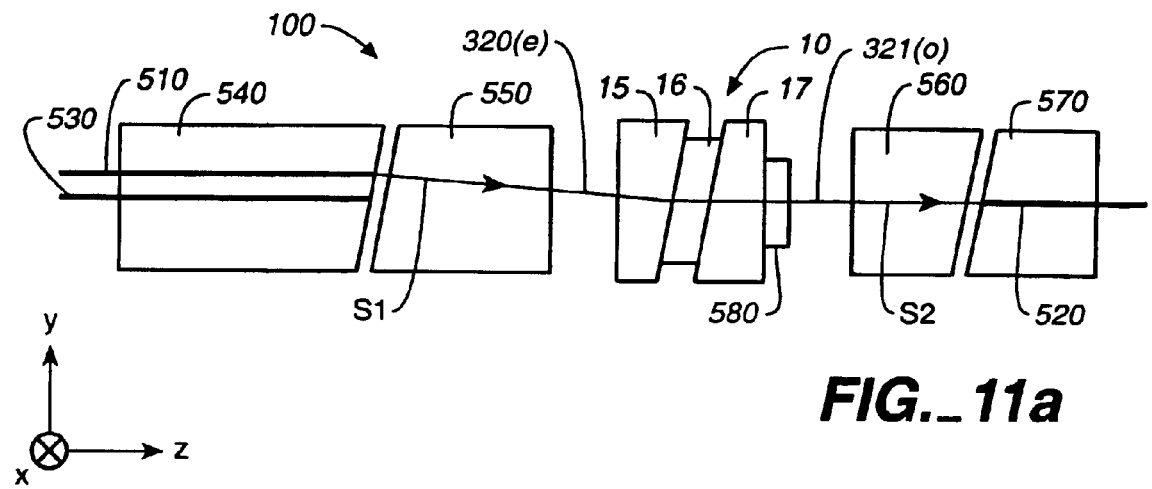
FIG._11a
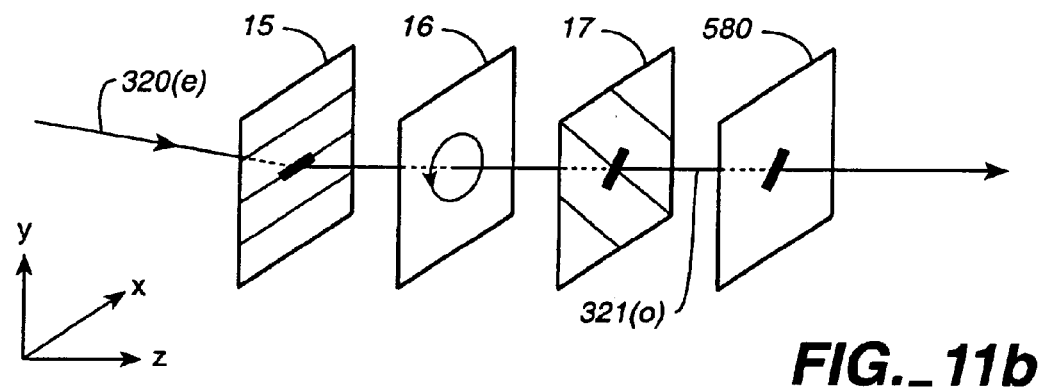
FIG._11b

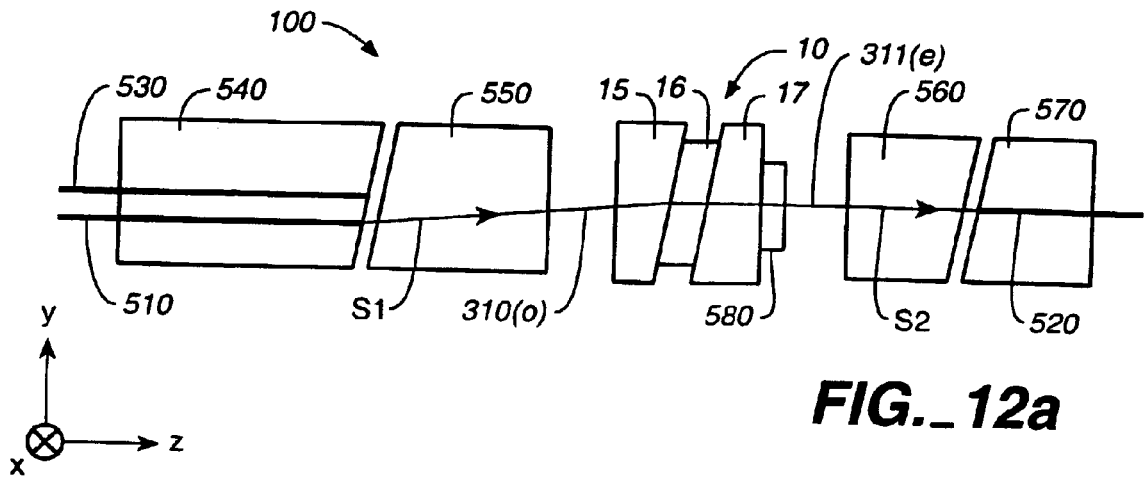
FIG._12a
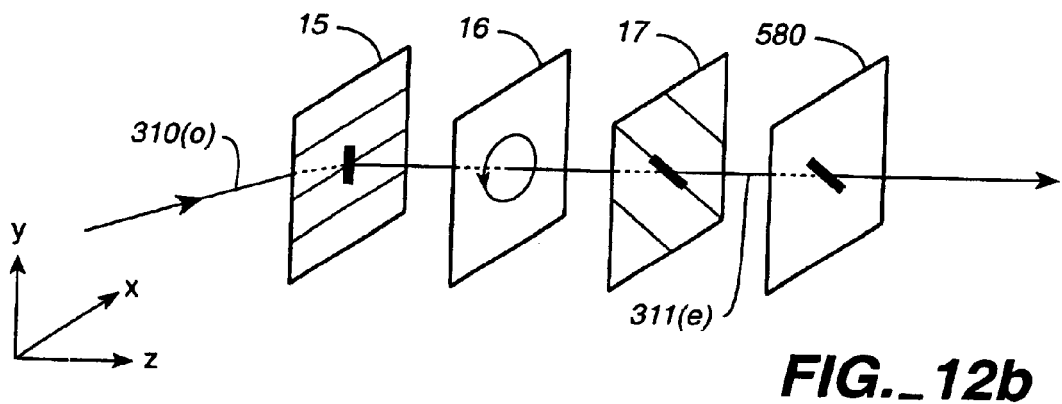
FIG._12b

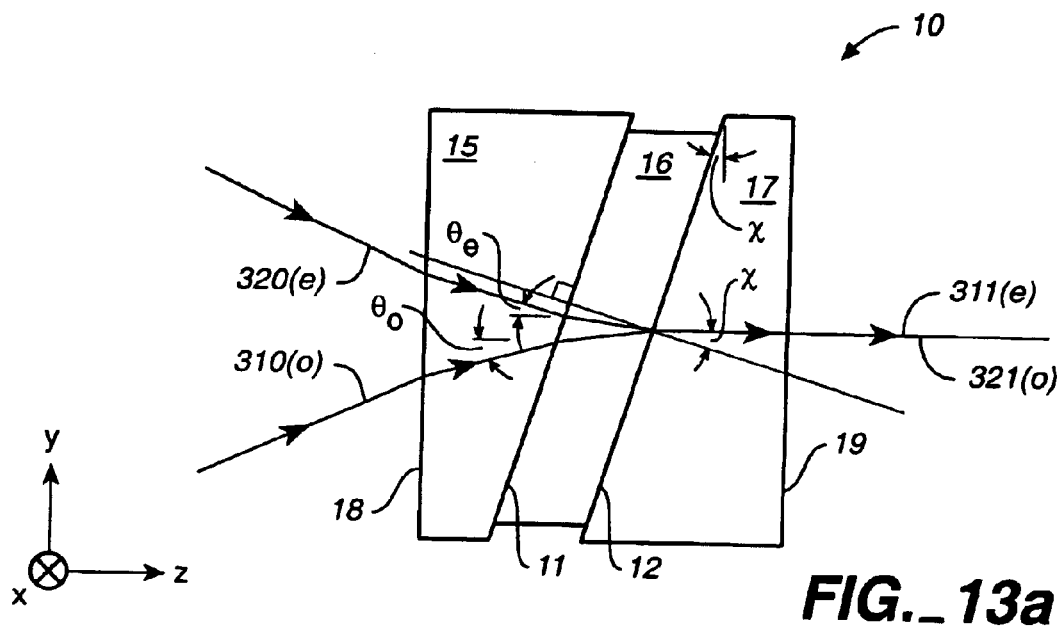
FIG._13a
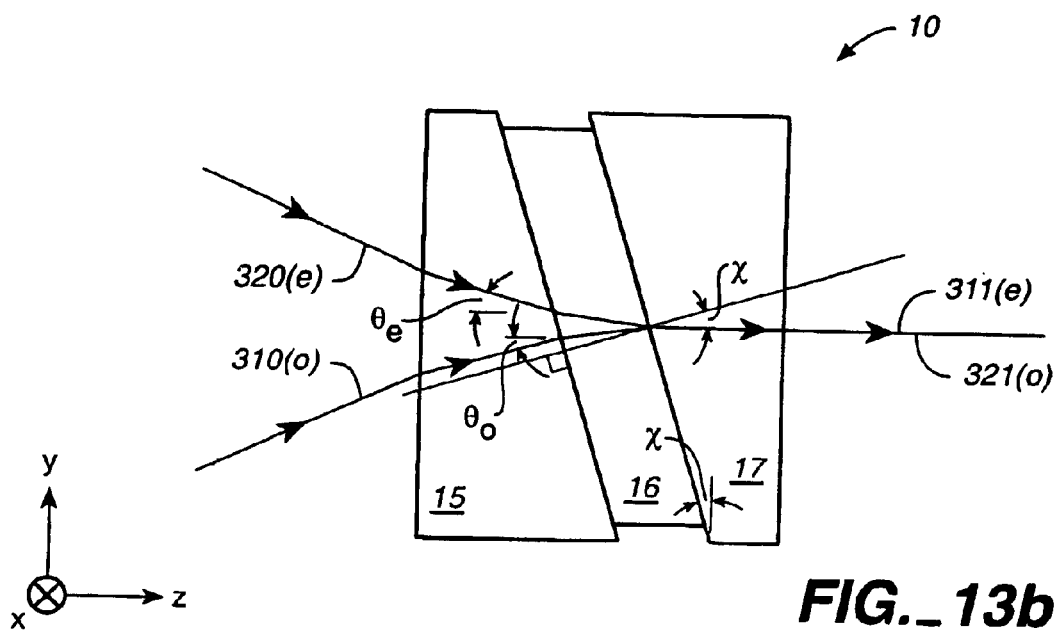
FIG._13b

THREE-PORT PM CIRCULAR HAVING ISOLATION FUNCTION

BACKGROUND OF THE INVENTION

Optical circulators are commonly used in optical communication systems and optical measurement systems. FIG. 1a shows a three-port Polarization Maintenance ("PM") circulator 100 that has ports 1, 2, and 3. Each of ports 1, 2, and 3 can be coupled to a PM fiber. As shown in FIG. 1, a polarized optical signal S1 entering port 1 exits from port 2 as a polarized optical signal S2. A polarized optical signal S2' entering port 2 exits from port 3 as a polarized optical signal S3.

SUMMARY OF THE INVENTION

In one aspect, the invention provides an optical device. The optical device includes a non-reciprocal combination-device and a polarizer. The non-reciprocal combination-device has a principal direction and a reverse principal direction. The non-reciprocal combination-device includes a first birefringent wedge, a second birefringent wedge, and a non-reciprocal rotating element. The polarizer receives a first light signal from the second birefringent wedge traveling in the principal direction and transmits a second light signal to enter the second birefringent wedge in the reverse principal direction. The first birefringent wedge has a first optical axis perpendicular to the principal direction. The second birefringent wedge has a second optical axis perpendicular to the principal direction, and the second optical axis forms a first angle with respect to the first optical axis. The non-reciprocal rotating element is optically coupled between the first and the second birefringent wedge. The non-reciprocal rotating element is designed to rotate the polarization of light passing through the non-reciprocal rotating element by a second angle.

In another aspect, the invention provides a method of using a non-reciprocal combination-device as a three-port PM circulator. The non-reciprocal combination-device has a principal direction and a reverse principal direction. The non-reciprocal combination-device includes a first birefringent wedge, a second birefringent wedge, and a non-reciprocal rotating element. The first birefringent wedge has a first optical axis perpendicular to the principal direction. The second birefringent wedge has a second optical axis perpendicular to the principal direction, and the second optical axis forms a first angle with respect to the first optical axis. The non-reciprocal rotating element is optically coupled between the first and the second birefringent wedge. The non-reciprocal rotating element is designed to rotate the polarization of light passing through the non-reciprocal rotating element by a second angle. The method includes the step of providing a first, a second, and a third PM fiber. The method includes the step of directing a first light signal exiting from the first PM fiber with a polarization parallel to the first optical axis to enter the first birefringent wedge in an input direction. The method includes the step of directing the first light signal exiting from the second birefringent wedge with a polarization perpendicular to the second optical axis to enter the second PM fiber. The method includes the step of directing a second light signal exiting from the second PM fiber with a polarization perpendicular to the second optical axis to enter the second birefringent wedge in the reverse principal direction. The method includes the step of directing the second light signal exiting from the first birefringent wedge with a polarization perpendicular to the first optical axis to enter the third PM fiber.

In another aspect, the invention provides a method of using a non-reciprocal combination-device as a three-port PM circulator. The non-reciprocal combination-device has a principal direction and a reverse principal direction. The non-reciprocal combination-device includes a first birefringent wedge, a second birefringent wedge, and a non-reciprocal rotating element. The first birefringent wedge has a first optical axis perpendicular to the principal direction. The second birefringent wedge has a second optical axis perpendicular to the principal direction, and the second optical axis forms a first angle with respect to the first optical axis. The non-reciprocal rotating element is optically coupled between the first and the second birefringent wedge. The non-reciprocal rotating element is designed to rotate the polarization of light passing through the non-reciprocal rotating element by a second angle. The method includes the step of providing a first, a second, and a third PM fiber. The method includes the step of directing a first light signal exiting from the first PM fiber with a polarization perpendicular to the first optical axis to enter the first birefringent wedge in an input direction. The method includes the step of directing the first light signal exiting from the second birefringent wedge with a polarization parallel to the second optical axis to enter the second PM fiber. The method includes the step of directing a second light signal exiting from the second PM fiber with a polarization parallel to the second optical axis to enter the second birefringent wedge in the reverse principal direction. The method includes the step of directing the second light signal exiting from the first birefringent wedge with a polarization parallel to the first optical axis to enter the third PM fiber.

Among the advantages of the invention are one or more of the following. Implementations of the invention provide a three-port PM circulator that can have small insertion loss, compact size, and reduced manufacturing cost. The three-port PM circulator can include isolation function. Other advantages will be readily apparent from the attached figures and the description below.

BRIEF DESCRIPTION OF THE DRAWINGS

FIG. 1a illustrates a three-port PM circulator 100 including ports 1, 2, and 3.

FIG. 1b illustrates an implementation of a non-reciprocal combination-device.

FIG. 1c illustrates a specific configuration of birefringent wedges and a Faraday rotator of FIG. 1b.

FIGS. 1d–1f illustrate alternative configurations of the birefringent wedges and the Faraday rotator of FIG. 1b.

FIG. 2a illustrates the paths traveled by light that enters the non-reciprocal combination-device of FIG. 1b in the principal direction.

FIG. 2b illustrates that light entering the first birefringent wedge as an e-ray in the principal direction exits from the second birefringent wedge as an o-ray in the first output direction.

FIG. 2c illustrates that light entering the first birefringent wedge as an o-ray in the principal direction exits from the second birefringent wedge as an e-ray in the second output direction.

FIG. 3a illustrates the paths traveled by light that enters the non-reciprocal combination-device of FIG. 1b in the first and the second input direction.

FIG. 3b illustrates that light entering the second birefringent wedge as an e-ray in the first input direction exits from the second birefringent wedge as an o-ray in the principal direction.

FIG. 3c illustrates that light entering the first birefringent wedge as an o-ray in the second input direction exits from the second birefringent wedge as an e-ray in the principal direction.

FIG. 4a illustrates the paths traveled by light that enters the non-reciprocal combination-device of FIG. 1b in the reverse principal direction.

FIG. 4b illustrates that light entering the second birefringent wedge as an e-ray in the reverse principal direction exits from the first birefringent wedge as an e-ray in the reverse principal direction.

FIG. 4c illustrates that light entering the second birefringent wedge as an o-ray in the reverse principal direction exits from the first birefringent wedge as an o-ray in, the reverse principal direction.

FIGS. 5a and 5b illustrate that a polarized optical signal S1 exiting from PM fiber 510 enters PM fiber 520 as a polarized optical signal S2.

FIGS. 6a and 6b illustrate that a polarized optical signal S2' exiting from PM fiber 520 enters PM fiber 530 as a polarized optical signal S3.

FIGS. 7a and 7b illustrate a three-port PM circulator configured as an isolator.

FIGS. 8a and 8b illustrate that a polarized optical signal S1 exiting from PM fiber 510 enters PM fiber 520 as a polarized optical signal S2.

FIGS. 9a and 9b illustrate that a polarized optical signal S2' exiting from PM fiber 520 enters PM fiber 530 as a polarized optical signal S3.

FIGS. 10a and 10b illustrate a three-port PM circulator configured as an isolator.

FIGS. 11a and 11b illustrate an implementation of three-port PM circulator 100 that includes a polarizer having a polarization direction perpendicular to the optical axis of birefringent wedge 17.

FIGS. 12a and 12b illustrate an implementation of three-port PM circulator 100 that includes a polarizer having a polarization direction parallel to the optical axis of birefringent wedge 17.

FIG. 13a illustrates an implementation of non-reciprocal combination-device 10 constructed using birefringent crystal materials with index $n_e$ larger than $n_o$.

FIG. 13b illustrates an implementation of non-reciprocal combination-device 10 constructed using birefringent crystal materials with index $n_e$ smaller than $n_o$.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principals herein may be applied to other embodiments. Thus, the present invention is not intended to be limited to the embodiments shown, but is to be accorded the widest scope consistent with the principals and features described herein.

The present invention will be described in terms of a three-port PM circulator having specific components having specific configurations. Similarly, the present invention will be described in terms of components having specific relationships, such as distances or angles between components. However, one of ordinary skill in the art will readily recognize that the devices and systems described can include other components having similar properties, other configurations, and other relationships between components.

In the instant application, implementations of three-port PM circulators using non-reciprocal combination-devices are described. The configuration and operation of the non-reciprocal combination device is described in greater detail below. The non-reciprocal combination-device generally includes two birefringent wedges and a non-reciprocal rotating element such as a Faraday rotator.

FIGS. 1b and 1c illustrate an implementation of a non-reciprocal combination-device 10 that includes a birefringent wedge 15, a birefringent wedge 17, and a non-reciprocal rotating element such as Faraday rotator 16. Birefringent wedges 15 and 17 are in the form of tapered plates. Surface 11 of birefringent wedge 15 faces surface 12 of birefringent wedge 17. In one implementation of non-reciprocal combination-device 10, surface 11 of birefringent wedge 15 substantially parallels surface 12 of birefringent wedge 17.

A coordinate system is illustrated including the x-direction, the y-direction and the z-direction. The optical axis of birefringent wedge 15 is in the x-direction The optical axis of birefringent wedge 17 is in the x–y direction. Faraday rotator 16 is designed in such a way that, when light passes through the Faraday rotator 16 either in the positive or the negative z-direction, the polarization of the light will be rotated substantially 45 degrees with respect to the positive z-axis. Non-reciprocal combination-device 10 has a principal direction that is in the positive z-direction. Non-reciprocal combination-device 10 also has a first input direction that is in the z−αy direction, a second input direction that is in the z+βy direction, a first output direction that is in the z+γy direction, and a second output direction that is in the z−δy direction. Where $\alpha$, $\beta$, $\gamma$ and $\delta$ are positive numbers.

In general, non-reciprocal combination-device 10, includes a first and a second birefringent wedge, and is constructed to perform one or more of the following six functions:

(1) light entering the first birefringent wedge as an e-ray in the principal direction exits from the second birefringent wedge as an o-ray in the first output direction;

(2) light entering the first birefringent wedge as an o-ray in the principal direction exits from the second birefringent wedge as an e-ray in the second output direction;

(3) light entering the first birefringent wedge as an e-ray in the first input direction exits from the second birefringent wedge as an o-ray in the principal direction;

(4) light entering the first birefringent wedge as an o-ray in the second input direction of exits from the second birefringent wedge as an e-ray in the principal direction;

(5) light entering the second birefringent wedge as an e-ray in the reverse principal direction exits from the first birefringent wedge as an e-ray in the reverse principal direction; and (6) light entering the second birefringent wedge as an o-ray in the reverse principal direction exits from the first birefringent wedge as an o-ray in the reverse principal direction.

FIGS. 2a and 2b illustrate the first function in detail. FIGS. 2a and 2c illustrate the second function in detail.

FIGS. 3a and 3b illustrate the third function in detail. FIGS. 3a and 3c illustrate the fourth function in detail. FIGS. 4a and 4b illustrate the fifth function in detail. FIGS. 4a and 4c illustrate the sixth function in detail.

As shown in FIGS. 2a and 2b, light 220(e) traveling in the principal direction (i.e., the positive z-direction) enters birefringent wedge 15 as an e-ray with the x polarization. Light 220(e) is refracted at surface 11. After passing through Faraday rotator 16, the polarization of light 220(e) is rotated positive 45 degrees with respect to the positive z-axis, and light 220(e) becomes light 221(o) with the x+y polarization. Light 221(o) is refracted again at surface 12 and enters birefringent wedge 17 as an o-ray. Light 221(o) exits from birefringent wedge 17 traveling generally in the first output direction (i.e., the z+γy direction).

As shown in FIGS. 2a and 2c, light 210(o) traveling in the principal direction (i.e., the positive z-direction) enters birefringent wedge 15 as an o-ray with the y polarization. Light 210(o) is refracted at surface 11. After passing through Faraday rotator 16, the polarization of light 210(o) is rotated positive 45 degrees with respect to the positive z-axis, and light 210(o) becomes light 211(e) with the x−y polarization. Light 211(e) is refracted again at surface 12 and enters birefringent wedge 17 as an e-ray. Light 211(e) exits from birefringent wedge 17 traveling generally in the second output direction (i.e., the z−δy direction).

As shown in FIGS. 3a and 3b, light 320(e) traveling in the first input direction (i.e., the z−αy direction) enters birefringent wedge 15 as an e-ray with the x polarization. Light 320(e) is refracted at surface 11. After passing through Faraday rotator 16, the polarization of light 320(e) is rotated 45 positive degrees with respect to the positive z-axis, and light 320(e) becomes light 321(o) with the x+y polarization. Light 321(o) is refracted again at surface 12 and enters birefringent wedge 17 as an o-ray. Light 321(o) exits from birefringent wedge 17 traveling in the principal direction (i.e., the positive z-direction).

As shown in FIGS. 3a and 3c, light 310(o) traveling in the second input direction (i.e., the z+βy direction) enters birefringent wedge 15 as an o-ray with the y polarization. Light 310(o) is refracted at surface 11. After passing through Faraday rotator 16, the polarization of light 310(o) is rotated positive 45 degrees with respect to the positive z-axis, and light 310(o) becomes light 311(e) with the x−y polarization. Light 311(e) is refracted again at surface 12 and enters birefringent wedge 17 as an e-ray. Light 311(e) exits from birefringent wedge 17 traveling in the principal direction (i.e., the positive z-direction).

As shown in FIGS. 4a and 4b, light 420(e) traveling in the reverse principal direction (i.e., the negative z-direction) enters birefringent wedge 17 as an e-ray with the x−y polarization. Light 420(e) is refracted at surface 12. After passing through Faraday rotator 16, the polarization of light 420(e) is rotated positive 45 degrees with respect to the positive z-axis, and light 420(e) becomes light 421(e) with the x polarization. Light 421(e) is refracted again at surface 11 and enters birefringent wedge 15 as an e-ray. Light 421(e) exits from birefringent wedge 15 traveling in the reverse principal direction (i.e., the negative z-direction).

As shown in FIGS. 4a and 4c, light 410(o) traveling in the reverse principal direction (i.e., the negative z-direction) enters birefringent wedge 17 as an o-ray with the x+y polarization. Light 410(o) is refracted at surface 12. After passing through Faraday rotator 16, the polarization of light 410(o) is rotated positive 45 degrees with respect to the positive z-axis, and light 410(o) becomes light 411(o) with the y polarization. Light 410(o) is refracted again at surface 11 and enters birefringent wedge 15 as an o-ray. Light 411(o) exits from birefringent wedge 15 traveling in the reverse principal direction (i.e., the negative z-direction).

Due to the differences in the refractive index between the o-ray and the e-ray, light 421(e) and 411(o) can exit from birefringent wedge 15 with different paths. However, when the paths of 421(e) and 411(o) are substantially parallel, light 421(e) and 411(o) can be coupled to an optical fiber using a collimator.

In the implementation of non-reciprocal combination-device 10 shown in FIG. 1c, the optical axes of birefringent wedges 15 and 17 are, respectively, in the x direction and the x−y direction. Faraday rotator 16 is designed in such a way that the polarization of light passing through the Faraday rotator 16 will be rotated a positive 45 degrees with respect to the positive z-axis.

In another implementation of non-reciprocal combination-device 10, as shown FIG. 1d, the optical axes of birefringent wedges 15 and 17 are, respectively, in the x direction and the x+y direction. Faraday rotator 16 is designed in such a way that the polarization of light passing through the Faraday rotator 16 will be rotated a negative 45 degrees with respect to the positive z-axis.

In a third implementation of non-reciprocal combination-device 10; as shown in FIG. 1e, the optical axes of birefringent wedges 15 and 17 are, respectively, in the y direction and the x+y direction. Faraday rotator 16 is designed in such a way that the polarization of light passing through the Faraday rotator 16 will be rotated a positive 45 degrees with respect to the positive z-axis.

In a fourth implementation of non-reciprocal combination-device 10, as shown in FIG. 1f, the optical axes of birefringent wedges 15 and 17 are, respectively, in the $\cos(\phi)x+\sin((\phi))$ y direction and the $\cos(\phi-45)x+\sin(\phi-45)$ y direction. Faraday rotator 16 is designed in such a way that the polarization of light passing through the Faraday rotator 16 will be rotated positive 45 degrees with respect to the positive z-axis.

In the implementation of non-reciprocal combination-device 10, as shown in FIG. 1b, birefringent wedges 15 and 17 are essentially in contact with Faraday rotator 16. In other implementations, other optical media (including air) can be inserted between birefringent wedge 15 and Faraday rotator 16, and between birefringent wedge 17 and Faraday rotator 16.

FIG. 5a illustrates an implementation of a three-port PM circulator 100 that includes a non-reciprocal combination-device 10. Three-port PM circulator 100 also includes a lens 550 and a lens 560. A PM fiber 510 and a PM fiber 530 are coupled to lens 550. The positions of PM fibers 510 and 530 can be fixed with a capillary 540. A PM fiber 520 is coupled to lens 560. The position of PM fiber 520 can be fixed with a capillary 570.

A polarization maintenance fiber generally has a fast axis. The phase velocity of light with the polarization parallel to the fast axis is larger than the phase velocity of light with the polarization perpendicular to the fast axis. The fast axis of PM fiber 510 can be substantially parallel or perpendicular to the optical axis of birefringent wedge 15. The fast axis of PM fiber 520 can be substantially parallel or perpendicular to the optical axis of birefringent wedge 17. The fast axis of PM fiber 530 can be substantially parallel or perpendicular to the optical axis of birefringent wedge 15.

FIGS. 5a and 5b illustrate that a polarized optical signal S1 exiting from PM fiber 510 enters PM fiber 520 as a polarized optical signal S2. More specifically, polarized optical signal S1 with the x-polarization exiting from PM fiber 510 is coupled to non-reciprocal combination-device 10 through lens 550, and enters non-reciprocal combination-device 10 in the first input direction (i.e., the z−αy direction) as e-ray 320(e). After passing through non-reciprocal combination-device 10, e-ray 320(e) becomes e-ray 321(o) traveling in the principal direction (i.e., the positive z-direction) with the x+y polarization. O-ray 321(o) enters PM fiber 520 through lens 560 as polarized optical signal S2.

FIGS. 6a and 6b illustrate that a polarized optical signal S2' exiting from PM fiber 520 enters PM fiber 530 as a polarized optical signal S3. More specifically, polarized optical signal S2' with the x+y polarization exiting from PM fiber 520 is coupled to non-reciprocal combination-device 10 through lens 560, and enters non-reciprocal combination-device 10 in the reverse principal direction (i.e., the negative z-direction) as o-ray 410(o). O-ray 410(o) passes through non-reciprocal combination-device 10 as o-ray 411(o) with the y-polarization., O-ray 411(o) enters PM fiber 530 through lens 550 as polarized optical signal S3.

FIGS. 7a and 7b illustrate a three-port PM circulator 100 configured as an isolator. A polarized signal exiting from PM fiber 530 with the y-polarization enters non-reciprocal combination-device 10 as o-ray 210(o). O-ray 210(o) passes through non-reciprocal combination-device 10 as e-ray 211(e) traveling in the second output direction (i.e., the z−δy direction) with the x−y polarization. E-ray 211(e) does not enter PM fiber 520.

Previously, FIG. 5a illustrates an implementation of three-port PM circulator 100 that enables a polarized optical signal S1 to enter non-reciprocal combination-device 10 as, e-rays. FIG. 8a illustrates another implementation of three-port PM circulator 100 that enables a polarized optical signal S1 to enter non-reciprocal combination-device 10 as o-rays.

FIGS. 8a and 8b illustrate that a polarized optical signal S 1 exiting from PM fiber 510 enters PM fiber 520 as a polarized optical signal S2. More specifically, polarized optical signal S1 with the y-polarization exiting from PM fiber 510 is coupled to non-reciprocal combination-device 10 through lens 550, and enters non-reciprocal combination-device 10 in the second input direction (i.e., the z+βy direction) as o-ray 310(o). After passing through non-reciprocal combination-device 10, o-ray 310(o) becomes e-ray 311(e) in the principal direction (i.e., the positive z-direction) with the x−y polarization. E-ray 311(e) enters PM fiber 520 through lens 560 as polarized optical signal S2.

FIGS. 9a and 9b illustrate that a polarized optical signal S2' exiting from PM fiber 520 enters PM fiber 530 as a polarized optical signal S3. More specifically, polarized optical signal S2' with the x−y polarization exiting from PM fiber 520 is coupled to non-reciprocal combination-device 10 through lens 560, and enters non-reciprocal combination-device 10 in the reverse principal direction (i.e., the negative z-direction) as e-ray 420(e). E-ray 420(e) passes through non-reciprocal combination-device 10 as e-ray 421(e) with the x-polarization. E-ray 421(e) enters PM fiber 530 through lens 550 as polarized optical signal S3.

FIGS. 10a and 10b illustrate three-port PM circulator 100 configured as an isolator. A polarized signal exiting from PM fiber 530 with the x-polarization enters non-reciprocal combination-device 10 as e-ray 220(e). E-ray 220(e) passes through non-reciprocal combination-device 10 as o-ray 221(o) traveling in the first output direction (i.e., the z+γy direction) with the x+y polarization o-ray 221(o) does not enter PM fiber 520.

The implementations of three-port PM circulator 100 in FIGS. 5a, 6a, 7a, and 8a each include a non-reciprocal combination-device 10. Non-reciprocal combination-device 10 includes a non-reciprocal rotating element such as Faraday rotator 16. Faraday rotator 16 is designed in such a way that, when light passes through the Faraday rotator 16 either in the positive or the negative z-direction, the polarization of the light will be rotated substantially 45 degrees with respect to the positive z-axis. That is, the rotation angle of Faraday rotator 16 is designed to be substantially 45 degrees. The rotation angle of Faraday rotator 16, in general, depends on several factors, such as, the temperature of Faraday rotator 16, and the wavelength of the light passing through Faraday rotator 16. The light passing through Faraday rotator 16 can contain wavelengths from λ−Δλ to λ+Δλ. Therefore, the rotation angle of Faraday rotator 16 can be differ from 45 degrees. If the rotation angle of Faraday rotator 16 substantially differs from 45 degrees, the polarization extinction ratio of optical signal S2 can be substantially degraded.

To improve the polarization extinction ratio for optical signal S2, a polarizer 580 can be added to three-port PM circulator 100. Polarizer 580 can be positioned between birefringent wedge 17 and lens 560. In one implementation, as shown in FIGS. 11a and 11b, the polarization direction of polarizer 580 can be perpendicular to the optical axis of birefringent wedge 17. In another implementation, as shown in FIGS. 12a and 12b, the polarization direction of polarizer 580 can be parallel to the optical axis of birefringent wedge 17. Three-port PM circulator 100 in FIGS. 11a and 11b is modified from three-port PM circulator 100 in FIG. 5a Three-port PM circulator 100 in FIGS. 12a and 12b is modified from three-port PM circulator 100 in FIGS. 8a.

In general, birefringent wedges 15 and 17 can be constructed from birefringent crystal materials, such as, calcite, rutile, lithium niobate or yttrium orthvanadate.

A birefringent crystal material in general has refractive indexes $n_e$ for e-rays and $n_o$ for o-rays. Non-reciprocal combination-device 10 can be constructed using birefringent crystal materials with the index $n_e$ larger than $n_o$, or birefringent crystal materials with index $n_e$ smaller than $n_o$.

FIGS. 13a and 13b illustrate implementations of non-reciprocal combination-device 10 including birefringent wedges 15 and 17 in the form of a tapered plate. Surface 11 of birefringent wedge 15 substantially parallels surface 12 of birefringent wedge 17. The tapering angle of birefringent wedges 15 and 17 is $\chi$.

FIG. 13a illustrates an implementation of non-reciprocal combination-device 10 constructed using birefringent crystal materials with an index $n_e$ larger than $n_o$. FIG. 13a also illustrates the paths traveled by e-ray 320(e) and o-ray 310(o). E-ray 320(e) is incident upon surface 11 of birefringent wedge 15 in the $\cos(\theta_e)z−\sin(\theta_e)y$ direction and exits from birefringent wedge 17 in the positive z-direction. Here $\theta_e$ satisfies equation $n_e \sin(\chi−\theta_e)=n_o \sin(\chi)$. O-ray 310(o) is incident upon surface 11 of birefringent wedge 15 in the $\cos(\theta_o)z+\sin(\theta_o)y$ direction and exits from birefringent wedge 17 in the positive z-direction. Here $\theta_o$ satisfies equation $n_o \sin(\chi+\theta_o)=n_e \sin(\chi)$.

FIG. 13b illustrates an implementation of non-reciprocal combination-device 10 constructed using birefringent crystal materials with an index $n_e$ smaller than $n_o$. FIG. 13b also illustrates the paths traveled by e-ray 320(e) and o-ray 310(o). E-ray 320(e) is incident upon surface 11 of birefringent wedge 15 in the $\cos(\theta_e)z−\sin(\theta_e)y$ direction and exits from birefringent wedge 17 in the positive z-direction. Here $\theta_e$ satisfies equation $n_e \sin(\chi+\theta_e)=n_o \sin(\chi)$. O-ray 310(o) is incident upon surface 11 of birefringent wedge 15 in the $\cos(\theta_o)z +\sin(\theta_o)y$ direction and exits from birefringent wedge 17 in the positive z-direction. Here $\theta_o$ satisfies equation $n_o \sin(\chi−\theta_o)=n_e \sin(\chi)$.

A method and system has been disclosed for providing a three-port PM circulator including isolation function. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical device comprising,
   a non-reciprocal combination-device having a principal direction and a reverse principal direction including
   (a) a first birefringent wedge having a first optical axis perpendicular to the principal direction,
   (b) a second birefringent wedge having a second optical axis perpendicular to the principal direction, the second optical axis forming a first angle with respect to the first optical axis,
   (c) a non-reciprocal rotating element optically coupled between the first and the second birefringent wedge and adapted to rotate a polarization of light passing there through by a second angle; and
   a polarizer adapted to polarize a first light signal traveling in the principal direction received from the second birefringent wedge and provide a polarized first light signal to a PM fiber and to a second light signal traveling in the reverse principal direction received from the PM fiber to provide a second polarized light signal.

2. The optical device of claim 1 wherein the polarizer has a polarization direction substantially perpendicular to the second optical axis of the second birefringent wedge.

3. The optical device of claim 1 wherein the polarizer has a polarization direction substantially parallel to the second optical axis of the second birefringent wedge.

4. The optical system of claim 1 wherein the first angle is substantially 45 degrees and the second angle is substantially 45 degrees.

5. The optical system of claim 1 wherein the non-reciprocal rotating element is a Faraday rotator.

6. The optical device of claim 1 further comprising a first lens adapted to transmit the first light signal received from a first PM fiber to enter the first birefringent wedge in an input direction.

7. The optical device of claim 6 further comprising a second lens adapted to transmit the first polarized light signal received from the second birefringent wedge to enter a second PM fiber.

8. The optical device of claim 7 wherein the second lens is adapted to transmit the second light signal received from the second PM fiber to enter the polarizer, and the first lens is adapted to transmit the second light signal received from the first birefringent wedge to enter a third PM fiber.

9. The optical device of claim 6 wherein the first lens is adapted to transmit the first light signal received from the first PM fiber to enter the first birefringent wedge in the input direction with a polarization parallel to the first optical axis.

10. The optical device of claim 9 further comprising a second lens adapted to transmit the first polarized light signal received from the polarizer with a polarization perpendicular to the second optical axis to enter a second PM fiber.

11. The optical device of claim 6 wherein the first lens is adapted to transmit the first light signal received from the first PM fiber to enter the first birefringent wedge in the input direction with a polarization perpendicular to the first optical axis.

12. The optical device of claim 11 further comprising a second lens adapted to transmit the first polarized light signal received from the polarizer with a polarization parallel to the second optical axis to enter a second PM fiber.

13. A method of processing light signals including:
   providing a first, a second, and a third PM fiber,
   directing a first light signal received from a first PM fiber with a polarization parallel to a first optical axis of a first birefringent element to enter a non-reciprocal combination-device in an input direction;
   directing the first light signal exiting from the a non-reciprocal combination-device with a polarization perpendicular to a second optical axis of a second birefringent element to pass through a polarizer and enter the second PM fiber,
   directing a second light signal exiting from the second PM fiber with a polarization perpendicular to the second optical axis to enter the non-reciprocal combination-device in a reverse principal direction; and
   directing the second light signal exiting from the non-reciprocal combination-device with a polarization perpendicular to the first optical axis to enter the third PM fiber.

14. The method of claim 13 wherein the second optical axis forms a first angle with respect to the first optical axis and where the first angle is substantially 45 degrees and where a non-reciprocal combination-device includes a rotating element adapted to rotate a polarization of light passing there through by a second angle, the second angle being substantially 45 degrees.

15. A method of circulating light signals comprising:
   directing a first light signal received from a first PM fiber with a polarization perpendicular to a first optical axis of a first birefringent element to enter a non-reciprocal combination-device in an input direction;
   directing the first light signal exiting from the non-reciprocal combination-device with a polarization parallel to a second optical axis of a second birefringent element to enter a second PM fiber;
   directing a second light received from the second PM fiber with a polarization parallel to the second optical axis to enter the non-reciprocal combination-device in a reverse principal direction; and
   directing the second light signal exiting from the non-reciprocal combination-device with a polarization parallel to the first optical axis to enter the third PM fiber.

16. The method of claim 15 wherein the step of directing the first light signal exiting from the non-reciprocal combination-device includes the step of directing the first light signal exiting from the non-reciprocal combination-device with a polarization parallel to the second optical axis to pass through a polarizer and to enter the second PM fiber.

17. The method of claim 15 wherein the second optical axis forms a first angle with respect to a first optical axis and where the first angle is substantially 45 degrees and where the non-reciprocal combination-device includes a rotating element adapted to rotate a polarization of light passing there through by a second angle, the second angle being substantially 45 degrees.

18. An optical system comprising:
   a non-reciprocal combination-device having a principal direction and a reverse principal direction including
   (a) a first birefringent wedge having a first optical axis perpendicular to the principal direction,
   (b) a second birefringent wedge having a second optical axis perpendicular to the principal direction, the second optical axis forming a first angle with respect to the first optical axis, (c) a non-reciprocal rotating element optically coupled between the first and the second birefringent wedge and adapted to rotate a polarization of light passing there through by a second angle;

a polarizer optically coupled to the second birefringent wedge;

a first PM fiber adapted to transmit a first light signal to enter the first birefringent wedge in an input direction;

a second PM fiber adapted to receive the first light signal from the polarizer and to transmit a second light signal to enter the polarizer in the reverse principal direction; and a third PM fiber adapted to receive the second light signal from the first birefringent wedge.

19. The optical system of claim 18, wherein the polarizer has a polarization direction substantially perpendicular to the second optical axis of the second birefringent wedge.

20. The optical system of claim 18, wherein the polarizer has a polarization direction substantially parallel to the second optical axis of the second birefringent wedge.

21. The optical system of claim 18, further comprising a first lens optically coupled between the first birefringent wedge and the first and third PM fibers.

22. The optical of claim 18 further comprising a second lens optically coupled between the second birefringent wedge and the second PM fiber.

23. The optical system of claim 18 wherein the first PM fiber is adapted to transmit the first light signal to enter the first birefringent wedge in the input direction with a polarization parallel to the first optical axis.

24. The optical system of claim 23 wherein the second PM fiber is adapted to receive the first light signal from the polarizer with a polarization perpendicular to the second optical axis and to transmit the second light signal to enter the second birefringent wedge in the reverse principal direction with a polarization perpendicular to the second optical axis.

25. The optical system of claim 24 wherein the third PM fiber is adapted to receive the second light signal from the first birefringent wedge with a polarization perpendicular to the first optical axis.

26. The optical system of claim 18 wherein the first PM fiber is adapted to transmit the first light signal to enter the fist birefringent wedge in the input direction with a polarization perpendicular to the first optical axis.

27. The optical system of claim 26 wherein the second PM fiber is adapted to receive the first light signal from the polarizer with a polarization substantially parallel to the second optical axis and to transmit the second light signal to enter the polarizer in the reverse direction with a polarization substantially parallel to the second optical axis.

28. The optical system of claim 27 wherein the third PM fiber is adapted to receive the second light signal from the first birefringent wedge with a polarization substantially parallel to the first optical axis.

29. The optical system of claim 18 wherein the first angle is substantially 45 degrees and the second angle is substantially 45 degrees.

30. The optical system of claim 18 wherein the non-reciprocal rotating element is a Faraday rotator.

* * * * *